(12) United States Patent
Soczka-Guth et al.

(10) Patent No.: US 6,355,149 B1
(45) Date of Patent: Mar. 12, 2002

(54) METHOD FOR PRODUCING A MEMBRANE USED TO OPERATE FUEL CELLS AND ELECTROLYZERS

(75) Inventors: Thomas Soczka-Guth, Hofheim; Jochen Baurmeister, Eckernförde; Georg Frank, Tübingen; Rüdiger Knauf, Aull, all of (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/555,973

(22) PCT Filed: Dec. 5, 1998

(86) PCT No.: PCT/EP98/07919

§ 371 Date: Aug. 14, 2000

§ 102(e) Date: Aug. 14, 2000

(87) PCT Pub. No.: WO99/29763

PCT Pub. Date: Jun. 17, 1999

(30) Foreign Application Priority Data

Dec. 8, 1997 (DE) .......................... 197 54 305

(51) Int. Cl.$^7$ .............................................. C25B 13/00
(52) U.S. Cl. ......................... 204/296; 429/29; 429/33; 429/46; 521/27; 525/330.9; 525/331.3
(58) Field of Search .......................... 204/296; 521/27; 429/29, 33, 46; 525/330.9, 331.3

(56) References Cited

U.S. PATENT DOCUMENTS 6,090,895 A * 7/2000 Mao et al. ................ 525/330.9

6,214,488 B1 * 4/2001 Helmer-Metzmann et al. ... 429/29

FOREIGN PATENT DOCUMENTS

| DE | 3321860 | 12/1984 |
| DE | 3402471 | 8/1985 |
| EP | 0417908 | 8/1990 |
| WO | 96/29359 | 9/1996 |

* cited by examiner

*Primary Examiner*—Bruce F. Bell
(74) *Attorney, Agent, or Firm*—Connolly Bove Lodge & Hutz LLP

(57) ABSTRACT

Membranes for use in polymer electrolyte fuel cells or electrolyzers comprise a sulfonated aromatic polyether ether ketone of the formula (I)

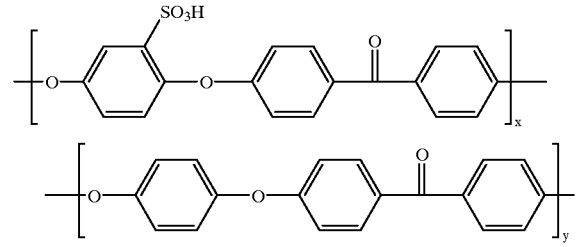

sPEEK where x + y = 1 wherein the ion exchange equivalent (I.E.C.) of the sulfonated polyether ether ketone is in the range from 1.35 to 1.95 mmol ($-SO_3H$)/g (polymer) and the membrane has a long-term stability of at least 1000 hours at an operating voltage of from 0.4 to 1.1 V.

13 Claims, 3 Drawing Sheets

METHOD FOR PRODUCING A MEMBRANE USED TO OPERATE FUEL CELLS AND ELECTROLYZERS

The invention relates to membranes comprising sulfonated polyether ether ketones (sPEEK) which, owing to a particular combination of various parameters, are particularly useful for use in fuel fells or electrolyzers.

Perfluorinated or partially fluorinated polymers bearing sulfonic acid groups are sufficiently well known from the literature. Membranes which comprise these polymers and are suitable for electrochemical purposes should have good membrane stabilities, sufficient chemical stability under the operating conditions of fuel cells and electrolyzers and have high proton conductivities (A.E. Steck in Materials For Fuel Cell Systems 1, Proc. Int. Symp. On New Materials for Fuel Cell Systems, O. Savadogo, P.R. Roberge, T.N. Veziroglu, Montreal 1995, pp. 74–94). However, membranes comprising these polymers are, owing to the fluorination steps necessary for the monomers, expensive and, in addition, are difficult to process. As a result, thin membranes (<50 μm) of fluorinated materials cannot be produced or can only be produced with great difficulty, as a result of which water management in these membranes is made more difficult.

Recycling of the polymers is made difficult or even impossible by the difficult handling of these materials, in particular by their sparing solubility.

The preparation of sulfonated polyether ether ketones is described, for example, in EP-A-0 008895 and EP-A-0 575 807 and also in Polymer, Vol. 35,1994, pages 5491–5497.

The use of polyether ketones in fuel cells is described, for example, in WO 96/29359. Specific information as to which of the polyether ether ketones described are usable under fuel cell conditions and thus of economic interest is, however, not given in the prior art.

Furthermore, the usability of non-perfluorinated materials is frequently still disputed in the current literature. In the past, the operating times which could be achieved using such materials in fuel cells were not more than 600 hours (A. E. Steck in "New Materials For Fuel Cell Systems 1", Proc. of the 1st Intern. Symp. On New Materials For Fuel Cell Systems, Montreal 1995, p. 82).

It is therefore an object of the present invention to provide membranes comprising sulfonated polyether ether ketones which are particularly suitable for use in fuel cells due to their chemical and physical properties and their high long-term stability. Furthermore, the membranes of the invention are an inexpensive and environmentally friendly substitute for membranes comprising fluorinated materials.

The present invention accordingly provides membranes which are, in particular, suitable for use in polymer electrolyte fuel cells or electrolyzers and comprise a sulfonated aromatic polyether ether ketone of the formula (I)

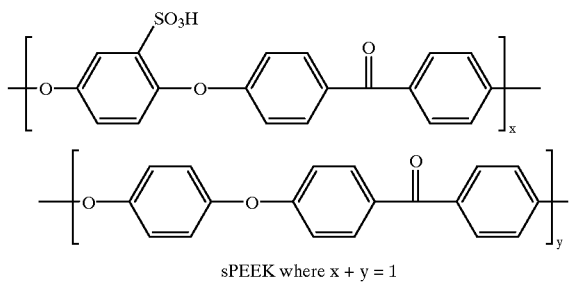

sPEEK where x + y = 1 wherein the ion exchange equivalent (I.E.C.) of the sulfonated polyether ether ketone is in the range from 1.35 to 1.95 mmol (—SO₃H)/g (polymer), preferably in the range from 1.50 to 1.75 mmol (—SO₃H)/g (polymer), and the membrane has a long-term stability of at least 1000 hours at an operating voltage of from 0.4 V to 1.1 V.

It has surprisingly been found that various chemical and physical parameters such as the molecular weight or the degree of sulfonation have to be kept within very narrow limits for sulfonated polyether ketones which are to be suitable for use in electrochemical cells such as fuel cells or electrolysis cells.

An important parameter is the molecular weight of the polymer used. The sulfonation of the base polymer and the associated conversion into a charge-bearing polyelectrolyte results in partial disentangling (cf. B Vollmert, Molecular Heterogeneties in Polymers and Association of Macromolecules, IUPAC Symposium Marienbad, Pure and Appl. Chem. 43, 183–205, 1975-and M. Hoffmann, Die Verhakung von Fadenmolekülen und ihr EinfluB auf die Eigenschaften von Polymeren, Prog. Colloid. Pol. Sci. 66, 73–86, 1979) of the polymer by mutual repulsion of the charge centers on the polymer backbone.

The membranes of the invention comprise sulfonated polymers having a molecular weight Mw in the range from 50,000 g/mol to 310,000 g/mol, preferably from 100,000 g/mol to 240,000 g/mol (determined in NMP (N-methylpyrrolidone), 0.05% lithium chloride addition, 60° C., PS calibration, Waters column by GPC). Molecular weights which are too low are reflected in unsatisfactory mechanical properties of the membranes; molecular weights which are too high require high dilutions in the sulfonation in order to keep the viscosity within a suitable range. High dilutions are uneconomical because of the increased consumption of sulfuric acid (see also Comparative Example with $M_w$=390,000, Table 2). In the case of polymers whose molecular weights are too high, the concentration has to be drastically reduced prior to the sulfonation since otherwise the solutions cannot be processed further.

The polymers used for producing the membranes of the invention have a modulus of elasticity (E modulus) in the dry state of greater than or equal to 1300 N/mm² and an elongation at break in the dry state after storage for four hours in a controlled atmosphere cabinet at 23° C. and 50% relative atmospheric humidity of ≧20% (thickness 40 μm), preferably ≧70%, in particular up to 150%. Owing to the high E modulus in the dry state, the membranes of the invention have a sufficient elongation at break, which is an important criterion for good further processibility.

In the wet state, the E modulus of the membranes must not drop below 100 N/mm² in order to ensure, even in the moistened state, a minimum strength of the membrane or membrane electrode unit.

A further important criterion which has to be met in order to obtain particularly high-performance membranes according to the invention is the degree of sulfonation of the polymers. For the purposes of the present invention, the degree of sulfonation is the proportion of sulfonated repeating units as a fraction of the total number of repeating units. The ion exchange equivalent (I.E.C.), which is expressed in millimol of sulfonic acid groups per gram of polymer, is proportional to this value. The reciprocal of the I.E.C. is referred to as the equivalent weight and is usually reported in gram of polymer per mole of sulfonic acid groups. The I.E.C. is calculated from the ratio of carbon to sulfur determined by elemental analysis.

Polyether ether ketones which are suitable for the membranes of the invention have an ion exchange equivalent of the sulfonated polyether ketone in the range from 1.35 to 1.95, in particular from 1.50 to 1.75 mmol (—SO₃H)/g (polymer).

If the I.E.C. value is higher, many problems can result. At a degree of sulfonation only slightly above the optimum degree of sulfonation, considerable swelling of the membrane on contact with water has to be expected. This swelling behavior has a severe adverse effect on the membrane-electrode composite (see above regarding strength in the wet state). If the degree of sulfonation is above the upper limit indicated, the polymer synthesized is not sufficiently mechanically stable in contact with water, or may even be completely or partially soluble in water, particularly at temperatures above 50° C., which is also reflected in an E modulus of less than 100 N/mm².

However, the most important parameter for a proton-conducting membrane, namely the proton conductivity, increases continuously with increasing degree of sulfonation, which is reflected in a higher power (W/cm²) of a relatively highly sulfonated membrane. It is therefore particularly difficult to find a good balance between a very high proton conductivity and a degree of sulfonation which is as high as possible without the polymer obtained having (in the presence of water) an excessively high solubility and an unacceptably low mechanical strength.

Even an I.E.C. of 1.30 is reflected in a very low performance of the fuel cell (see first example in Table 1).

The sulfonated polymers used for the membranes of the invention have, measured in contact with pure water, a proton conductivity at room temperature of >3×10⁻³ S/cm, preferably >2×10⁻² S/cm, in particular up to 300 mS/cm.

The membranes of the invention comprising sulfonated aromatic polyether ketones of the formula (I) enable operating times of at least 1000 hours, in particular ≧3000 hours, preferably ≧4000 hours, to be achieved without problems even using a non-perfluorinated material.

EXAMPLES

1) Preparation of the sulfonated polymer 30 g of dried polyether ketone are introduced into 420 g of concentrated sulfuric acid at about 5° C. while stirring vigorously by means of a toothed disk. The mixture is then stirred for another 30 minutes and the temperature is subsequently increased to 50° C. over a period of 45 minutes.

As soon as the desired degree of sulfonation has been reached, the solution is cooled back down to 5° C. and is slowly poured into ice water. The product is washed with deionized water until free of sulfate (test with $BaCl_2$ solution), dried in a vacuum drying oven and milled. The degree of sulfonation is calculated from the carborn/sulfur ratio obtained by elemental analysis.

2) Production of the films

The milled, dry polymer (particle size about 80 μm, water content <0.5%) is quickly introduced into the appropriate amount of NMP and dissolved under inert gas at 80° C. with intensive stirring so as to give an about 18% strength solution.

The still hot solution is filtered through a polypropylene nonwoven having a mean mesh opening of 1 μm and, still on the same day, is spread on glass plates using a doctor blade and dried overnight at 80° C. under atmospheric pressure in a dust-free convection oven. The films are peeled dry from the glass plate.

Figure 1:
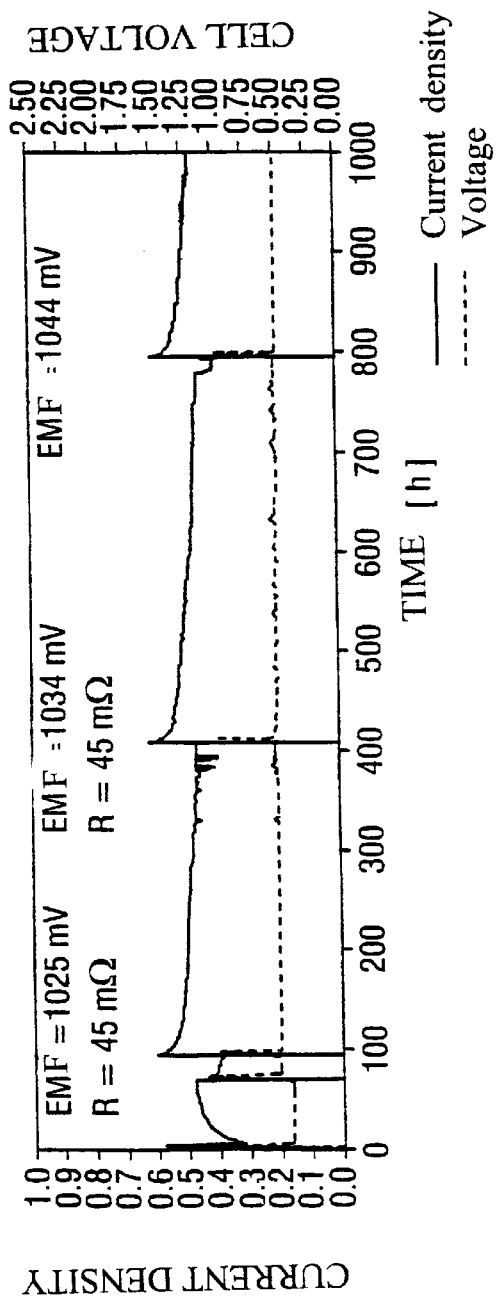
FIGS. 1 to 5 are graphs of current density versus time and cell voltage versus time for an sPEEK membrane with the operating times of 1000, 2000, 3000, 4000 and 5000 hours, respectively.
Figure 2:
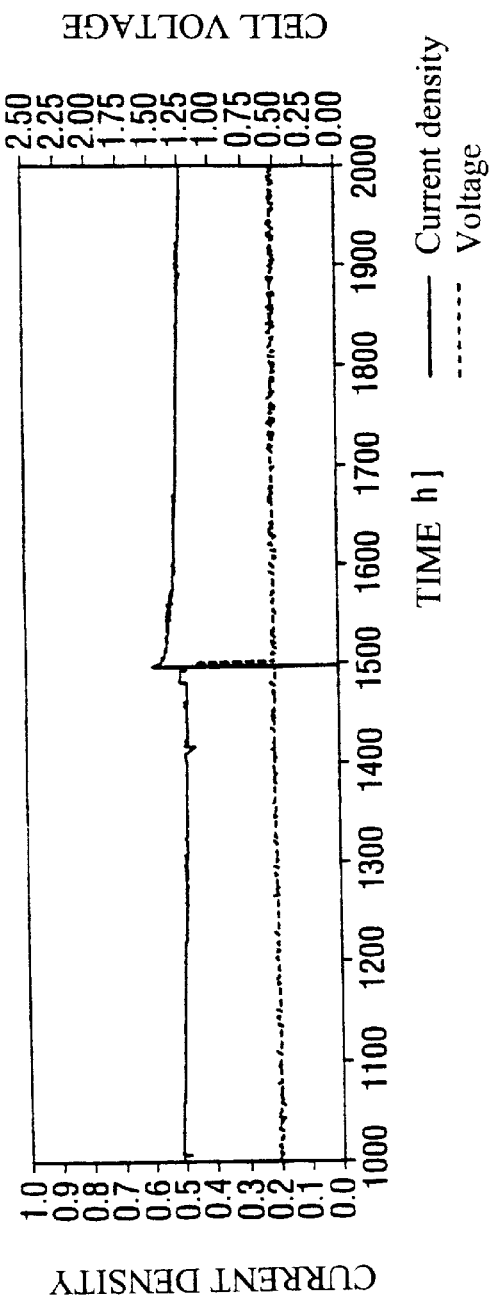
Figure 3:
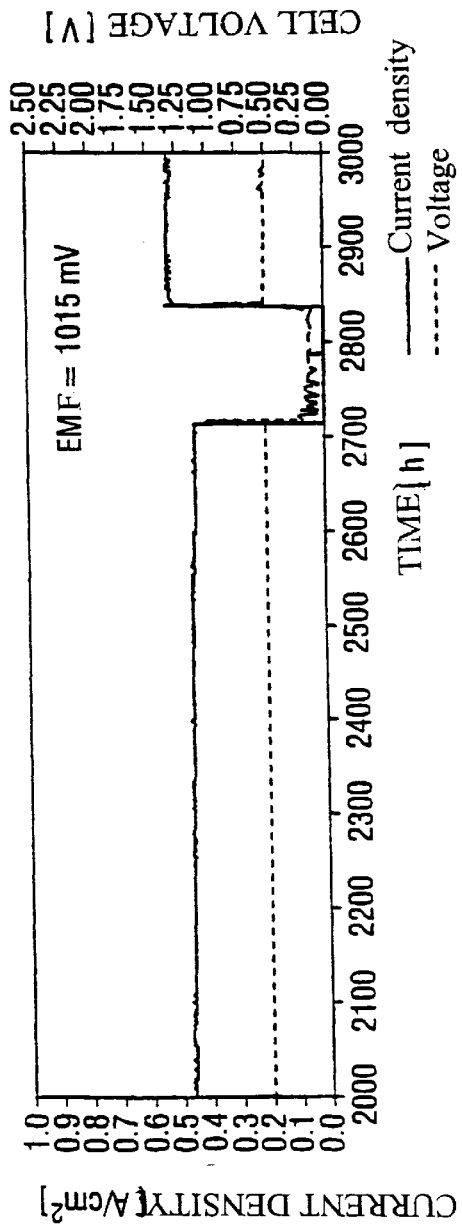
Figure 4:
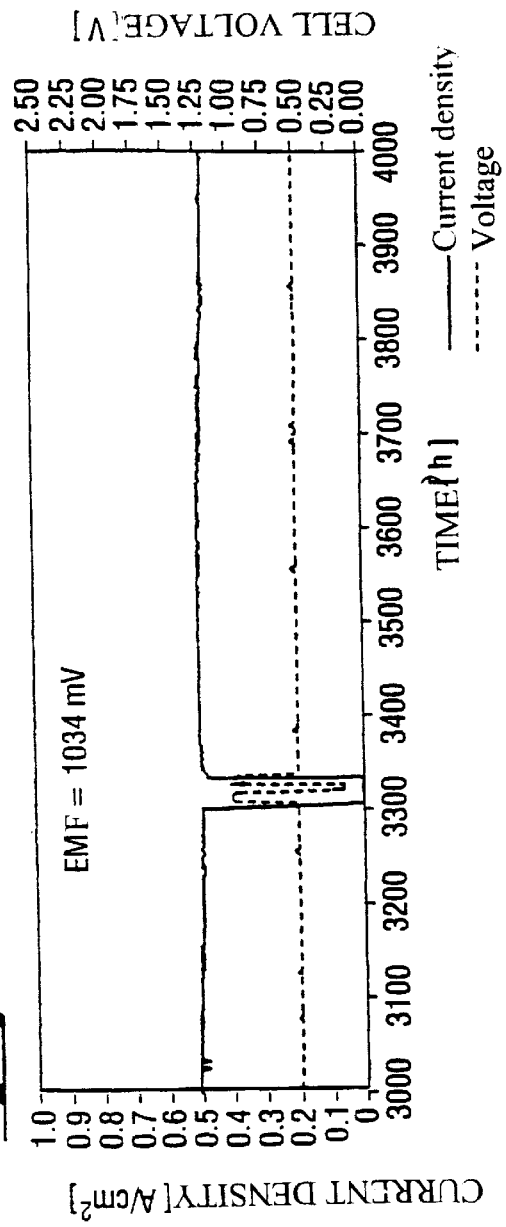
Figure 5:
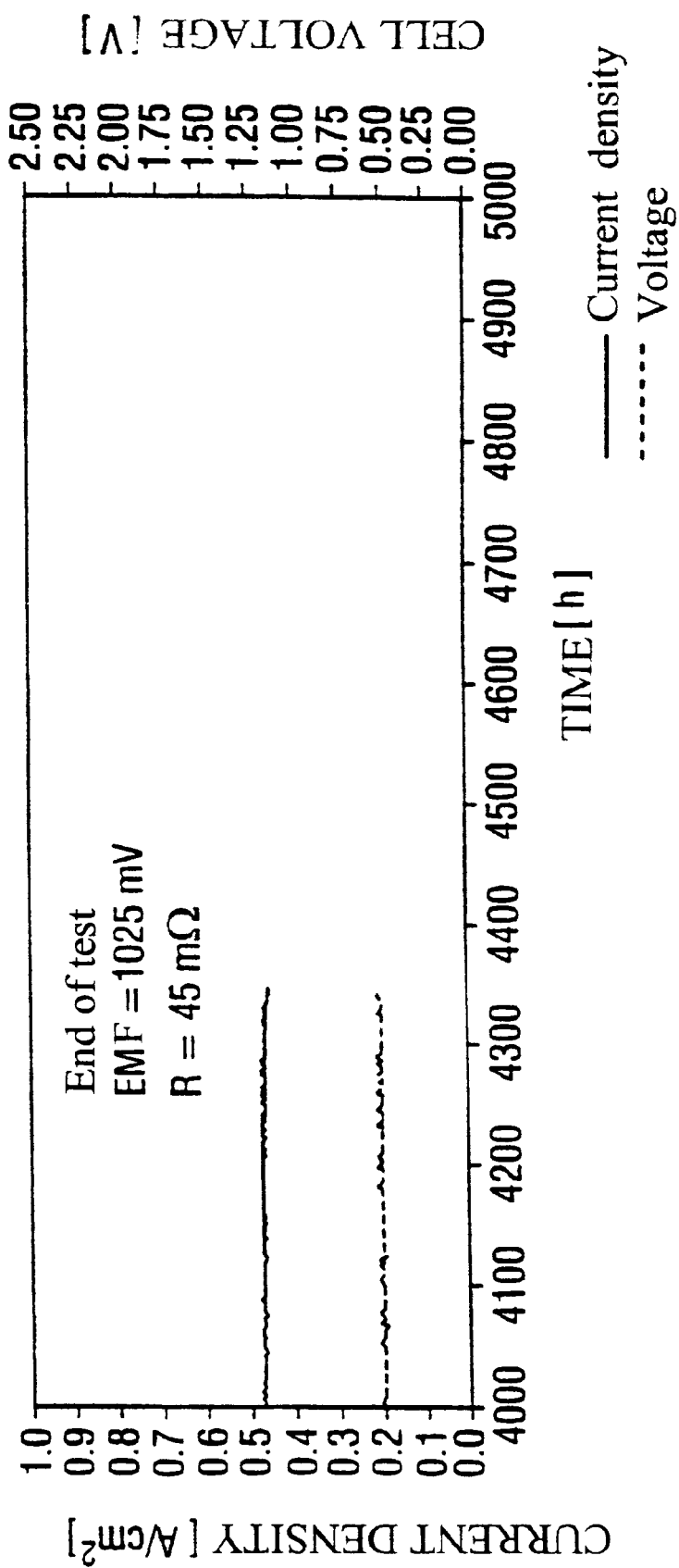

Lifetime test of an sPEEK membrane having a degree of sulfonation of 50% and a thickness of 40 μm over 4300 hours of operation using $H_2/O_2$ at 50° C., atmospheric pressure.

The power drop at 2700 hours and 3330 hours is due to the gas supply failing twice during the experiment. After the gas supply had been restored, the fuel cell generated the same power as before.

Table 1: Power data for sPEEK

The performance of the polyether ketones listed was measured using a fuel cell (operating conditions: cell temperature 45° C., atmospheric pressure to max. 0.2 bar gauge pressure, moistening on the air side, electrode produced in-house containing 0.2–0.3 mg of Pt/cm²).

| Membrane | IEC (mmol of $SO_3H$/g polymer) | Degree of sulfonation | Power at 0.7 V | max. power |
|---|---|---|---|---|
| sPEEK | 1.30 | 42% | 34 mW | 52 mW at 510 mV |
| sPEEK | 1.47 | 50% | 222 mW | 386 mW at 519 mV |
| sPEEK | 1.62 | 54% | 290 mW | 560 mW at 550 mV |
| sPEEK | 1.73 | 58% | 278 mW | 523 mW at 523 mV |
| sPEEK | 1.80 | 61% | 235 mW | 389 mW at 490 mV |
| sPEEK | 1.82 | 63% | 229 mW | 342 mW at 517 mV |

Table 2:

Tear strengths, E modulus of a dry film (at 23° C., 50% atmospheric humidity) and associated molecular weights by PC in NMP

| Membrane | Degree of sulfonation | E modulus [N/mm] | Elongation at break | Molecular weight $M_w$ | Molecular weight distribution $M_w/M_n$ |
|---|---|---|---|---|---|
| sPEEK | 42% (1.30) | 1519 | 22% | 154,000 | 2.90 |
| sPEEK | 50% (1.47) | 1606 | 61% | n.f. | n.f. |
| sPEEK | 54% (1.62) | 1527 | 59% | 176,000 | 2.20 |
| sPEEK | 58% (1.73) | 1385 | 100% | 203,000 | 2.94 |
| sPEEK | 61% (1.80) | 713 | 112% | 390,000 | 5.40 |

Table 3:

Proton conductivity data and mechanical properties are measured in water at 23° C. (proton conductivity measured using a 4-pole arrangement at a frequency in the range from 30 to 3000 Hz, phase from −1 to +1 Hz). The molecular weight data are as shown in Table 2).

Pretreatment of the membrane for the measurement of proton conductivity: place in 5% strength nitric acid for 30 minutes at 40° C. and then wash with distilled water.

Pretreatment of the membrane for measurement of the mechanical properties: place in 5% strength nitric acid for 30 minutes at 40° C. and then wash with distilled water. Dry at 23° C. and 50% relative atmospheric humidity and irrigate for 30 minutes at 23° C.

| Membrane | Degree of sulfonation (IEC) | E modulus [N/mm] | Elongation at break | Proton conductivity [mS/cm] |
|---|---|---|---|---|
| sPEEK | 42% (1.30) | 730 | 107% | 15 |
| sPEEK | 50% (1.47) | n.f. | n.f. | 42 |
| sPEEK | 54% (1.62) | 523 | 211% | n.f. |
| sPEEK | 58% (1.73) | 516 | 218% | 57 |
| sPEEK | 61% (1.80) | 180 | 281% | 56 | n.f. = no figures available

What is claimed is:

1. A membrane comprising a sulfonated aromatic polyether ether ketone of the formula (I)

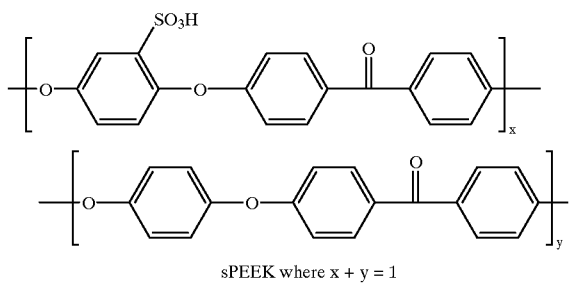

sPEEK where x + y = 1 wherein the ion exchange equivalent (I.E.C.) of the sulfonated polyether ether ketone is in the range from 1.35 to 1.95 mmol (—SO$_3$H)/g (polymer) and the membrane has a long-term stability of at least 1000 hours at an operating voltage of from 0.4 to 1.1 V.

2. A membrane as claimed in claim 1, wherein the molecular weight M$_W$ of the sulfonated polymer of the formula (I) is in the range from 50,000 to 310,000 /mol determined by GPC:NMP, 0.05% LiCl addition, 60° C.

3. A membrane as claimed in claim 2, wherein the elongation at break of the polymer of the formula (I) in the dry state after storage for four hours in a controlled atmosphere cabinet at 23° C. and 50% relative atmospheric humidity is ≧20% and the E-modulus of the polymer of the formula (I) in the dry state is >1300 N/mm.

4. A membrane as claimed in claim 3, wherein the molecular weight M$_W$ of the sulfonated polymer of the formula (I) is in the range from 100,000 g/mol to 240,000 g/mol determined in N-methylpyrrolidone by GPC at 60° C.

5. The membrane as claimed in claim 4, wherein the sulfonated polymer of the formula (I) has, in contact with pure water, a proton conductivity >2×10$^{-3}$ S/cm.

6. The membrane as claimed in claim 5, wherein the proton conductivity is up to 300 mS/cm.

7. A membrane as claimed in claim 1, wherein the sulfonated polymer of the formula (I) has, in contact with pure water, a proton conductivity of >3×10$^{-3}$ S/cm.

8. A membrane as claimed in claim 1, wherein the E modulus of the polymer of the formula (I) in the dry state is >1300 N/mm.

9. A membrane as claimed in claim 1, wherein the elongation at break of the polymer of the formula (I) in the dry state after storage for four hours in a controlled atmosphere cabinet at 23° C. and 50% relative atmospheric humidity is ≧20%.

10. The membrane as claimed in claim 1, wherein the ionic exchange equivalent of the sulfonated polyether ketone is in the range from 1.50 to 1.75 mmol (—SO$_3$H)/g (polymer).

11. The membrane as claimed in claim 10, wherein the elongation at break of a polymer of the formula (I) in the dry state after storage for four hours in a controlled atmosphere cabinet or 23° C. and 50% relative atmospheric humidity is ≧70%.

12. The membrane as claimed in claim 11, wherein the elongate at break of a polymer of the formula (I) in the dry state is up to 150% therein.

13. A fuel cell or electrolysis cell which comprises the membrane as claimed in claim 1.

* * * * *